Figure 10:
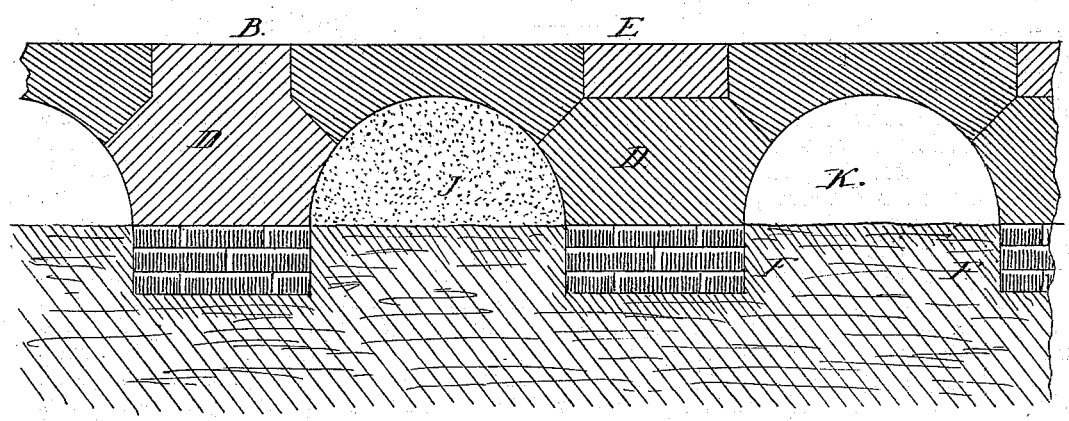

GEORGE H. MOORE.
Improvement in Composition Pavements and Foundation for the same.
No. 125,831. Patented April 16, 1872.
2 Sheets--Sheet 1.
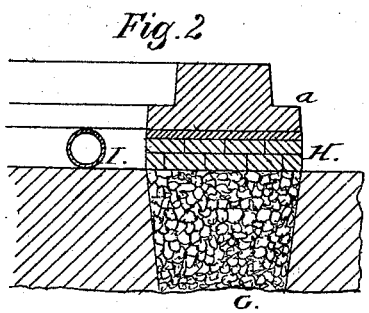
Fig. 2.
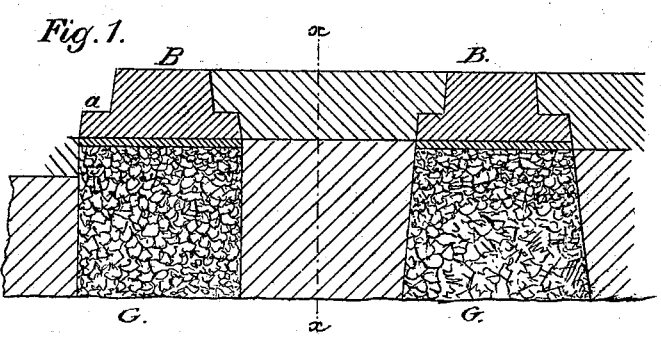
Fig. 1.
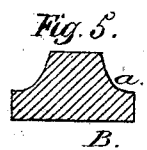 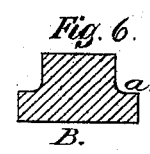 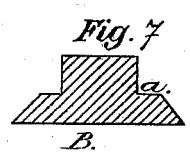  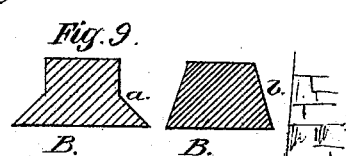
Fig. 5. Fig. 6. Fig. 7. Fig. 8. Fig. 9.
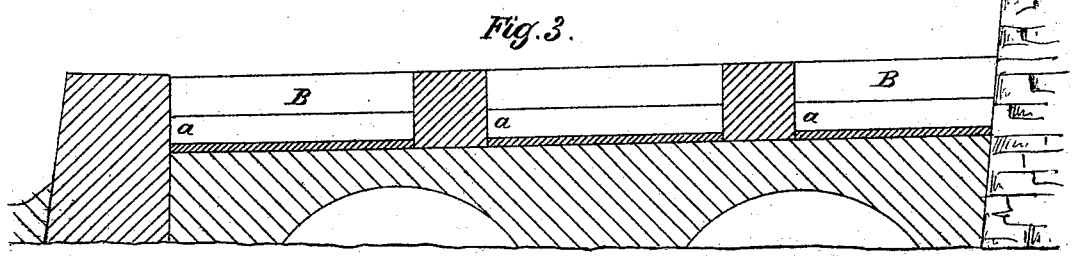
Fig. 3.
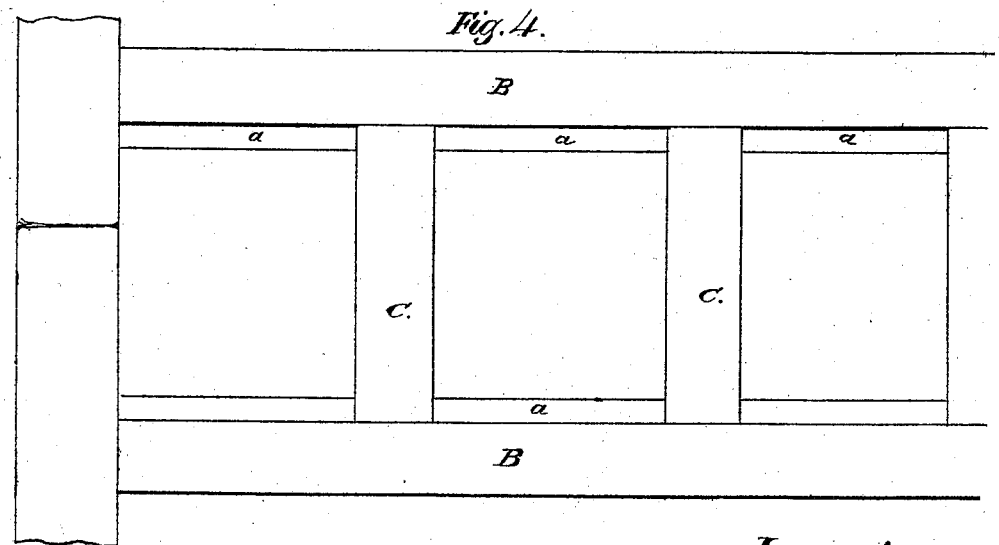
Fig. 4.
Witnesses:
Fredk. Artas
Wm. J. Peyton
Inventor:
George H. Moore,
By James L. Norris
Atty.

GEORGE H. MOORE.
Improvement in Composition Pavements and Foundation for the same.

No. 125,831. Patented April 16, 1872.

Witnesses:
Fred't Artos
W. J. Peyton.

Inventor:
George H. Moore.
By James L. Norris
Atty.

125,831

UNITED STATES PATENT OFFICE.

GEORGE H. MOORE, OF NORWICH, CONNECTICUT.

IMPROVEMENT IN COMPOSITION PAVEMENTS AND FOUNDATIONS FOR THE SAME.

Specification forming part of Letters Patent No. 125,831, dated April 16, 1872.

*To all whom it may concern:*

Be it known that I, GEORGE H. MOORE, of Norwich, in the county of New London and State of Connecticut, have invented a new and useful Improvement in Composition Pavement and Foundations for the same, of which the following is a specification:

My invention consists, first, in employing artificial or stone blocks or strips of any desired dimensions with flanges, or with inclined concave or convex sides without flanges, and arranging said blocks or strips upon the ground or a previously-prepared foundation, so as to create a compartment or compartments of any desired shape or dimensions, into which is placed a plastic material, which when "set" or indurated, will be supported by and upon the said flanged sides or inclined sides of the said artificial or stone blocks or strips; second, in forming the blocks or strips in position so that when the same have set, and a plastic material is placed in the compartment or compartments created, the said indurated blocks or strips will support the said plastic blocks thus formed, whereby the entire pavement may be formed of a plastic material and in position; third, in combining with artificial or stone blocks, as above set forth, one or more artificial or natural stone separating blocks or strips, formed with flanges or with inclined sides without flanges, the ends of which are formed to correspond to the sides of the artificial or natural stone blocks or strips before mentioned, for the purpose of furnishing additional support to blocks formed in position, and also for partitioning any compartments formed by the said artificial or stone blocks or strips, as hereinafter set forth; fourth, in creating a space beneath a block or blocks formed in position by the removal of the earth for the purpose of preventing the upheaval of any of the said blocks from the effects of frost; also for purposes of ventilation and for laying or placing pipes, drains, &c.; fifth, in forming a series of trenches in the ground or bed where it is designed to lay a pavement or sidewalk of the desired dimensions, into which is placed material, as hereinafter described, so as to form a foundation.

Figure 11:
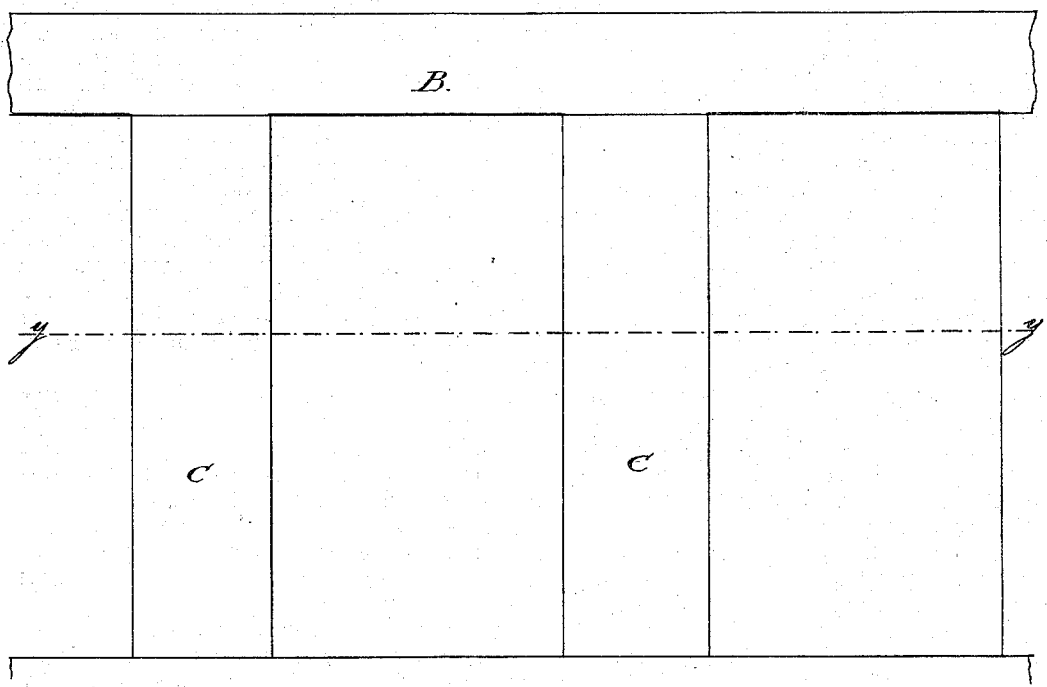

In the drawing, Figure 1 is a sectional view of the improved pavement and foundation, the curb or border being removed. Fig. 2 is a similar view, showing the artificial or hard-stone blocks arranged upon brickwork, which is arranged on a foundation, with a space beneath the plastic block. Fig. 3 is a section of the invention taken on the like *x x* of Fig. 1. Fig. 4 is a top or plan view of the artificial or hard-stone blocks and separating blocks, strips showing compartments for receiving the plastic material. Figs. 5, 6, 7, 8, and 9 are transverse sections of the blocks or strips formed with flanges or with inclined concave or convex sides for supporting the plastic block when indurated. Fig. 10 is a sectional view, taken on the line $yy$ of Fig. 11, of artificial or hard-stone blocks, supporting indurated blocks formed in position, said artificial or hard-stone blocks or strips resting upon piers. Fig. 11 is a top or plan view of the invention, as shown in Fig. 10.

Referring to the drawing, the letter B designates artificial or stone blocks or strips, which are made of any desired dimensions, and with flanges *a a*, or with inclined, concave, or convex sides *b b*. These blocks or strips are arranged upon the ground or a previously-prepared bed or foundation, in such relation to each other as to create a compartment or compartments of any desired shape or dimensions, into which is placed a plastic material—such as concrete or any of the most approved compositions—so that when the said plastic material has set or indurated, the same will be supported upon the flanges or the inclined convex or concave sides of the said artificial or hard-stone blocks or strips.

By this means I am enabled to support a plastic, concrete, or composition block, when the same has set or indurated upon the said artificial or hard-stone blocks or strips, whereby the two will be of a uniform and continuous smooth top surface, the plastic block or blocks being prevented from sinking or being depressed owing to their being supported, as above set forth.

The artificial or hard-stone blocks will be made of any desired length or dimensions, and arranged on the ground or previously-prepared bed, so that any desired size of compartments can be created for receiving the plastic material.

To divide the compartment into separate compartments I employ artificial or hard-stone strips C, the end or ends of which are so formed as to correspond with the sides of the artificial or hard-stone blocks or strips B. These separating blocks or strips also serve as braces for the blocks or strips B, and will in some instances be formed with flanges or inclined concave or convex sides, so as to support the sides of the plastic-formed block or section contiguous thereto.

Instead of forming the artificial or hardstone blocks or strips in one piece, as shown in Figs. 1, 5, 6, 7, 8, and 9, they may be made in separate pieces, as designated by the letters D E, as in Fig. 10.

The form of the sides of the artificial or hardstone blocks may be varied from that shown in the several figures of the drawing without any departure from the spirit of my invention, so long as the principle of sustaining and supporting the plastic-formed blocks is retained.

So far I have described the invention as employing artificial or hard-stone blocks or strips formed out of position, and then arranging them in position in relation to each other, as desired, for receiving and supporting a plastic block or section when indurated; but to such the invention is not limited, for I will in many instances form the supporting blocks or strips B of the forms shown in position from a plastic composition or concrete, so that when the same have "set" or indurated they will support and sustain the plastic-formed block or section, so that the entire pavement, floor, or walk will be produced from an indurated plastic concrete or composition formed in position.

The blocks or strips B will in some instances be built upon a series of piers, F F, of masonry, as shown in Fig. 10, or they may be arranged upon a series of concrete foundations, G G, placed within trenches excavated in the ground where it (the pavement, walk, or floor) is to be laid.

In some instances masonry H will be arranged or built upon the top of the concrete foundation G, and the blocks or strips B placed thereon, and upon the ground I place sand or sand and gravel of such a depth as to be on or about a level with the top of the masonwork H, and upon this bed is formed the plastic block, reserving to myself the right to arrange a pipe or drain, I, under the plastic-formed stone previous to or after forming the said plastic block or section in position.

The letter J, Fig. 10, designates such substance as sand or sand and gravel arranged upon the ground or bed between the blocks or strips B upon which is formed the plastic-formed block, so that its under portion will be of a concave or other such form, depending upon the form imparted to the top portion of the sand or gravel.

By this means, when the plastic-formed block has indurated and removed, and the sand or gravel also removed, a space, K, will be created between the earth or bed and the bottom of the block, when the latter is again replaced in its position. This space will be found of much importance, preventing all upheaval of any of the blocks from the effects of frost, and also for the purpose of ventilation, and for laying or placing pipes or drains, &c., between the earth and the plastic-formed blocks.

It is evident that either of the plastic-formed blocks formed in position can be removed and replaced without disturbing any of the adjoining blocks or sections, and in some instances I will make the joints separable by employing powdered steatite or an equivalent powdered substance, as set forth in my former Letters Patent dated November 28, 1871.

I do not claim a continuous sheet pavement cast with supporting ribs on the under side; neither do I claim a continuous sheet pavement supported upon piles and brick-work in the form of an arch—such are not new; but

Having thus described my invention, what I claim as new, and desire to secure by Letters Patent, is—

1. A block formed in position from a plastic material, combined and supported by and upon blocks or strips B, arranged upon the ground or previously-prepared bed of a pavement, walk, or floor.

2. The blocks or strips B, provided with flanges, or with inclined concave or convex sides without flanges, formed of artificial or hard-stone blocks or strips, either in or out of position, for the purpose of supporting a plastic block or section formed in position, substantially as specified.

3. Artificial or hard-stone blocks or strips C, arranged in relation to the supporting-blocks or strips B, and to the plastic-formed blocks, substantially as and for the purpose set forth.

4. A plastic block, formed in position and supported upon blocks or strips B, so as to create a recess between the same and the bed beneath, for the purpose set forth.

To the above I have signed my name this 19th day of March, A. D. 1872.

GEORGE H. MOORE.

Witnesses:
JAMES L. NORRIS,
WM. J. PEYTON.